(12) United States Patent
Jutte

(10) Patent No.: US 6,876,619 B1
(45) Date of Patent: Apr. 5, 2005

(54) OPTICAL SCANNING DEVICE

(75) Inventor: Petrus Theodorus Jutte, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 808 days.

(21) Appl. No.: 09/806,127

(22) PCT Filed: Jul. 17, 2000

(86) PCT No.: PCT/EP00/06821

§ 371 (c)(1),
(2), (4) Date: Mar. 27, 2001

(87) PCT Pub. No.: WO01/09885

PCT Pub. Date: Feb. 8, 2001

(30) Foreign Application Priority Data

| Jul. 28, 1999 | (EP) | 99202480 |
| Sep. 21, 1999 | (EP) | 99203083 |
| Nov. 5, 1999 | (EP) | 99203678 |

(51) Int. Cl.[7] .............................................. G11B 7/00
(52) U.S. Cl. ............................ 369/112.01; 369/112.24; 369/44.23
(58) Field of Search ................. 369/112.01, 112.08, 369/112.13, 112.23, 112.24, 44.11, 44.12, 44.23, 44.25, 44.28; 358/474, 481, 493, 494, 495; 359/721, 719

(56) References Cited

U.S. PATENT DOCUMENTS 5,699,341 A    12/1997   Sugi et al. .................. 369/112

Primary Examiner—Muhammad Edun
(74) Attorney, Agent, or Firm—Michael E. Belk

(57) ABSTRACT

An optical scanning device is adapted for scanning record carriers (13, 27) having transparent layers (14, 28) of different thicknesses through which a converging beam (12, 26) must pass. An objective lens (11) of the device is designed to form the converging beam (14) for scanning through a first transparent layer (14). When scanning through a second transparent layer (28), the objective lens is operated at different conjugate distances, resulting in a small field. The field is increased by introducing spherical aberration in the radiation beam (25) incident on the objective lens and compensating this spherical aberration in the objective lens.

11 Claims, 4 Drawing Sheets

OPTICAL SCANNING DEVICE

Figure 1:
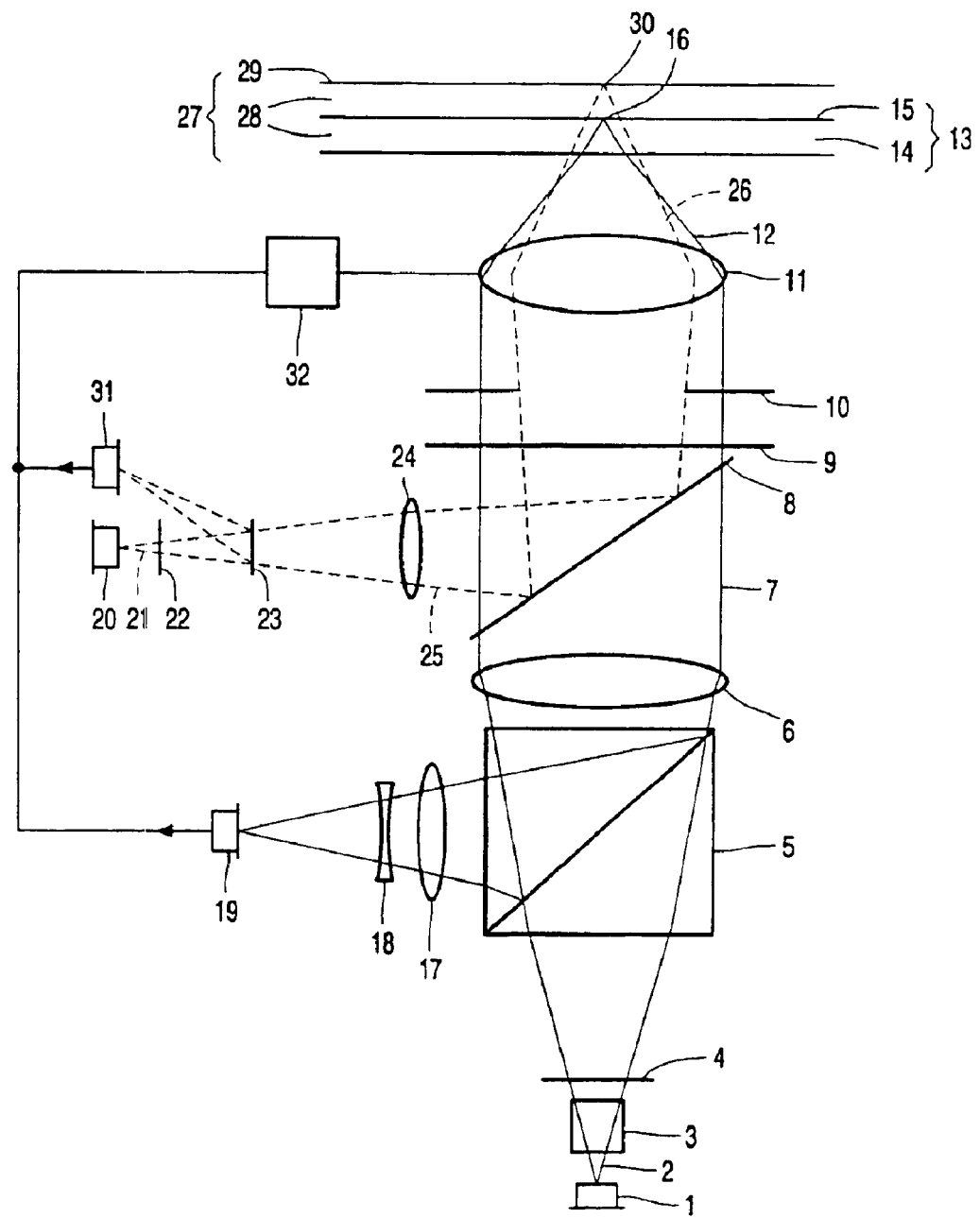

The invention relates to an optical scanning device for scanning in a first mode a first type of record carrier having a first information layer and a first transparent layer of a first thickness and for scanning in a second mode a second type of record carrier having a second information layer and a second transparent layer of a second thickness different from the first thickness, comprising a radiation source for generating at least one radiation beam and an objective system designed for operation at a first set of conjugates to form a focus at the first information layer in the first mode and for operation at a second, different set of conjugates to form a focus at the second information layer in the second mode. The invention also relates to an optical scanning device for scanning a record carrier having an information layer, comprising a radiation source for generating a non-collimated radiation beam, an objective system for converging the non-collimated radiation beam to a focus on the information layer, and a control system for controlling a motion of the objective lens perpendicular to it optical axis.

An optical scanning device for scanning record carriers having different transparent layers is known from U.S. Pat. No. 5,699,341. When the known device scans a record carrier of the DVD type, having a transparent layer of 0.6 mm thickness, an objective lens focusses a collimated radiation beam to a focus through the transparent layer. When it scans a record carrier of the CD type, having a transparent layer of 1.2 mm thickness, the same objective lens focusses a diverging radiation beam to a focus through a thicker transparent layer. When changing from DVD to CD, the radiation beam incident on the objective lens is changed from collimated to diverging by inserting a negative lens in the collimated radiation beam. A servo circuit controls the position of the objective lens relative to a central position in a direction perpendicular to its optical axis, such that the focus follows a desired track of the information layer. A disadvantage of the known device is that the quality of the focus formed by the objective lens when scanning a record carrier of the CD type deteriorates when the objective lens is moved away from its central position during tracking. Moreover, the design of the known device is not applicable to optical paths which differ from the disclosed optical path.

It is an object of the invention to provide a scanning device which does not have the mentioned disadvantage.

This object is met by an optical scanning device for scanning in a first mode a first type of record carrier having a first information layer and a first transparent layer of a first thickness and for scanning in a second mode a second type of record carrier having a second information layer and a second transparent layer of a second thickness different from the first thickness, comprising a radiation source for generating at least one radiation beam and an objective system designed for operation at a first set of conjugates to form a focus at the first information layer in the first mode and for operation at a second, different set of conjugates to form a focus at the second information layer in the second mode, characterized according to the invention in that the device comprises an optical element, arranged in the radiation path in the second mode from the radiation source to the objective system, for introducing spherical aberration in the radiation beam. The radiation path is the optical path followed by the radiation beam in a specific mode. Radial tracking is effected by displacing the objective lens away from the optical axis. This off-axis position introduces coma in the radiation beam, which reduces the quality of the focus. The amount of coma in the first mode is relatively small, because the objective lens is designed for proper imaging in this mode, i.e. the lens complies with the sine condition, giving a large field. In the second mode, the lens does not comply with the sine condition, and the amount of coma is relatively large. The amount of coma in the second mode can, according to the invention, be reduced by introducing a certain amount of an aberration other than coma, i.e. spherical aberration, in the radiation beam incident on the objective lens. The reduction of the coma increases the field of the objective lens in the second mode. The amount of spherical aberration to be introduced is preferably larger than 25 m$\lambda$ rms and, for particular embodiments, larger than 30 m$\lambda$, where $\lambda$ is the wavelength of the radiation beam.

The invention is applicable to various optical paths between the radiation source and the record carrier, such as a path with only one radiation beam, beam splitter and objective lens, or a path with two radiation beams, positive or negative lens and objective lens. Where one radiation beam is used, the change in conjugates may be achieved by translating the radiation source along the optical axis or by inserting an element having optical power, e.g. a lens in the optical path between the radiation source and the objective lens. The spherical aberration may be introduced by a separate optical element or by a modified beam splitter or lens.

Another aspect of the invention relates to an optical scanning device for scanning a record carrier having an information layer, comprising a radiation source for generating a non-collimated radiation beam and an objective system for converging the non-collimated radiation beam to a focus on the information layer, characterized in that the device comprises an optical element arranged in the radiation path from the radiation source to the objective lens for introducing spherical aberration in the non-collimated radiation beam, the spherical aberration having a sign opposite to the sign of the spherical aberration of a positive plano-spherical lens. The spherical aberration of the optical element reduces the coma of the objective lens, thereby increasing its field. The amount of spherical aberration is preferably larger than 25 m$\lambda$ rms, where $\lambda$ is the wavelength of the radiation beam.

The scanning device may be adapted to scanning record carriers where the radiation beam passes through a transparent layer before converging on the information layer, the spherical aberration incurred by the radiation beam in passing the transparent layer is generally compensated by spherical aberration introduced the objective lens. The spherical aberration of the optical element has a sign, which is preferably opposite to the sign of the spherical aberration of the objective lens. The scanning device may also be adapted to scanning an information layer on which the radiation beam is directly incident, i.e. the first or second transparent layer has a thickness equal to zero.

The sign of the spherical aberration of the optical element is preferably opposite to that of the spherical aberration introduced by any positive plano-spherical lens.

The optical element is preferably a positive lens, e.g. a lens having positive optical power, suitable for converging the radiation beam emanating from the radiation source. Such a lens allows a short optical path and, consequently, a compact optical head.

Figure 2:
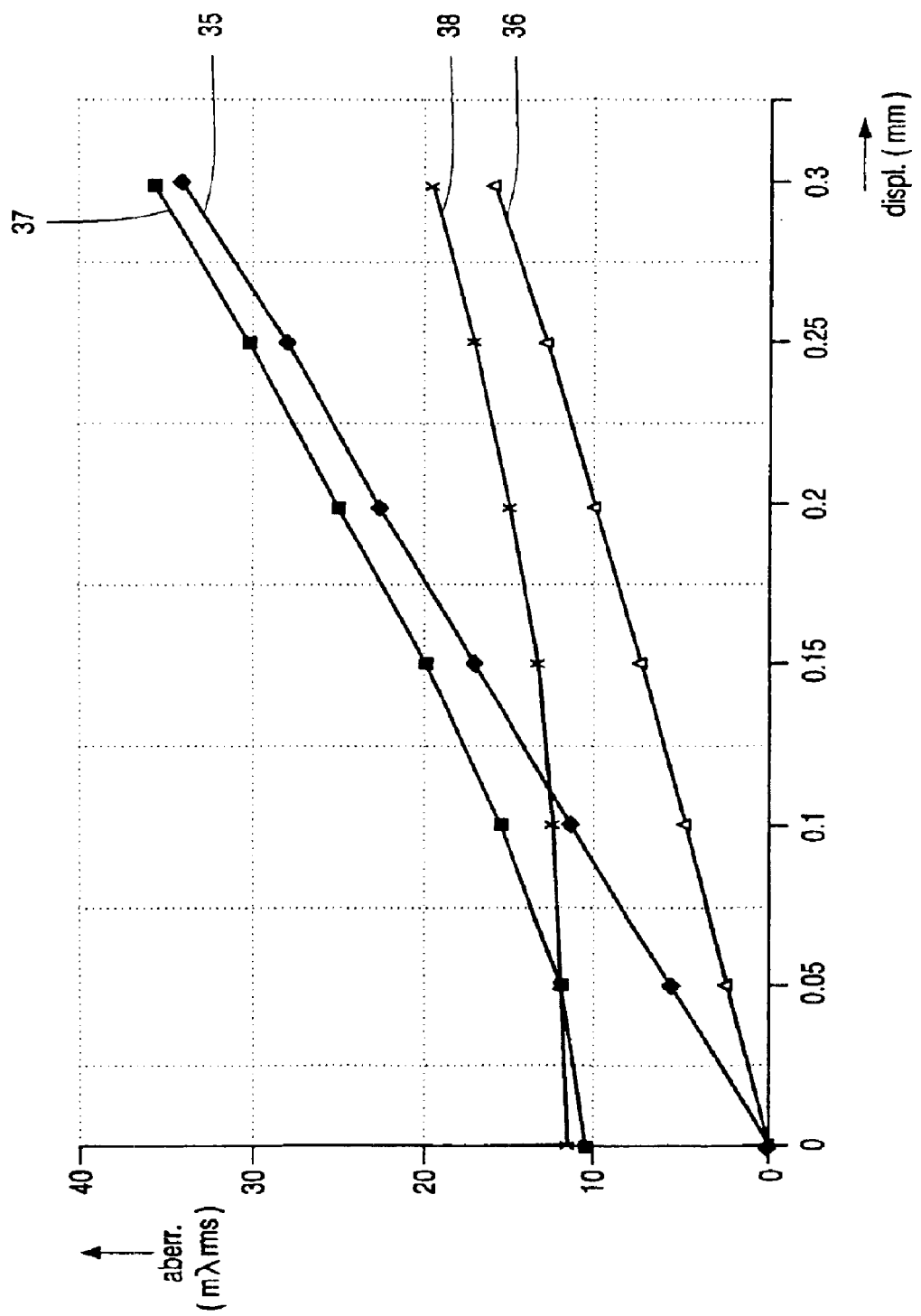
Figure 3:
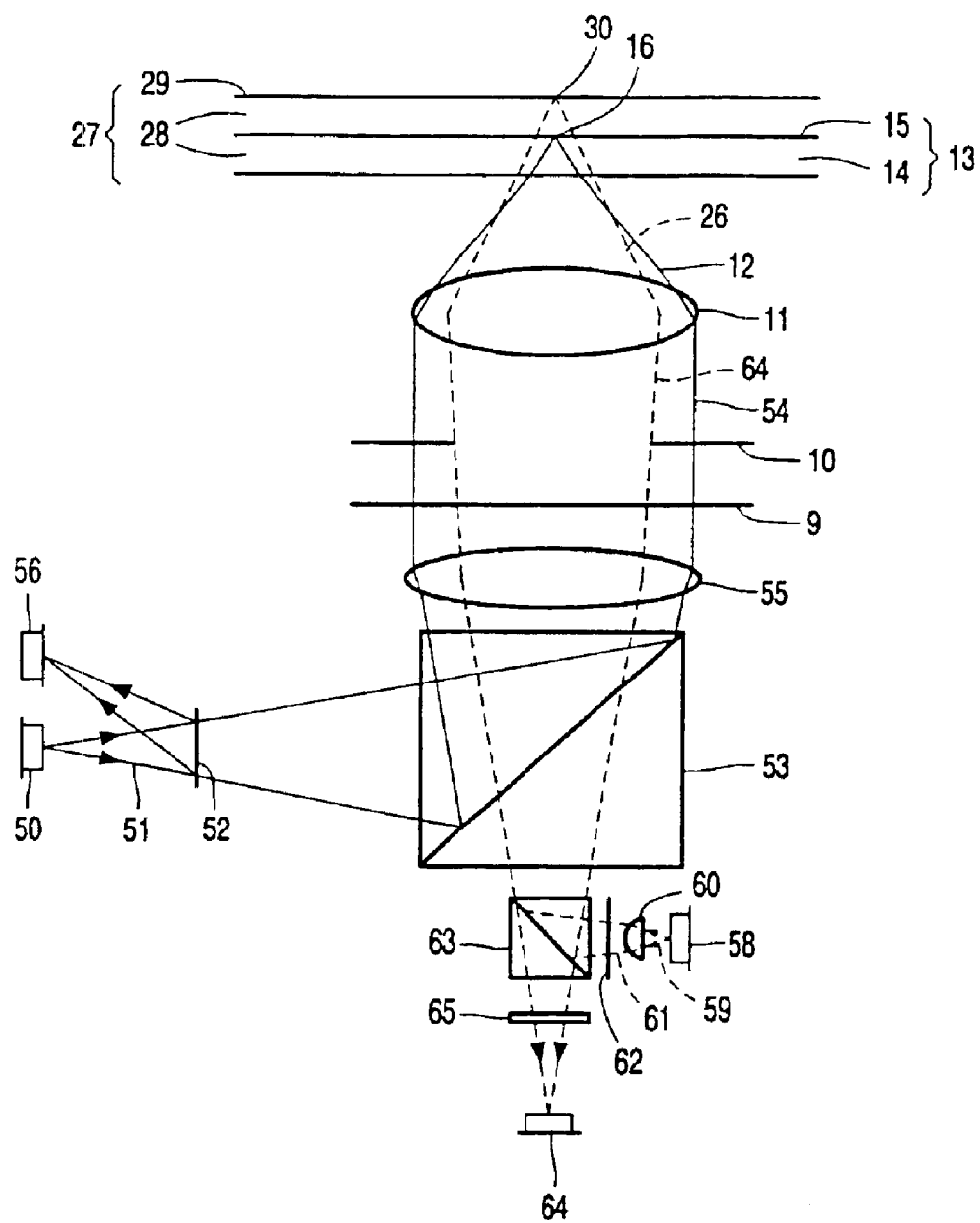
Figure 4:
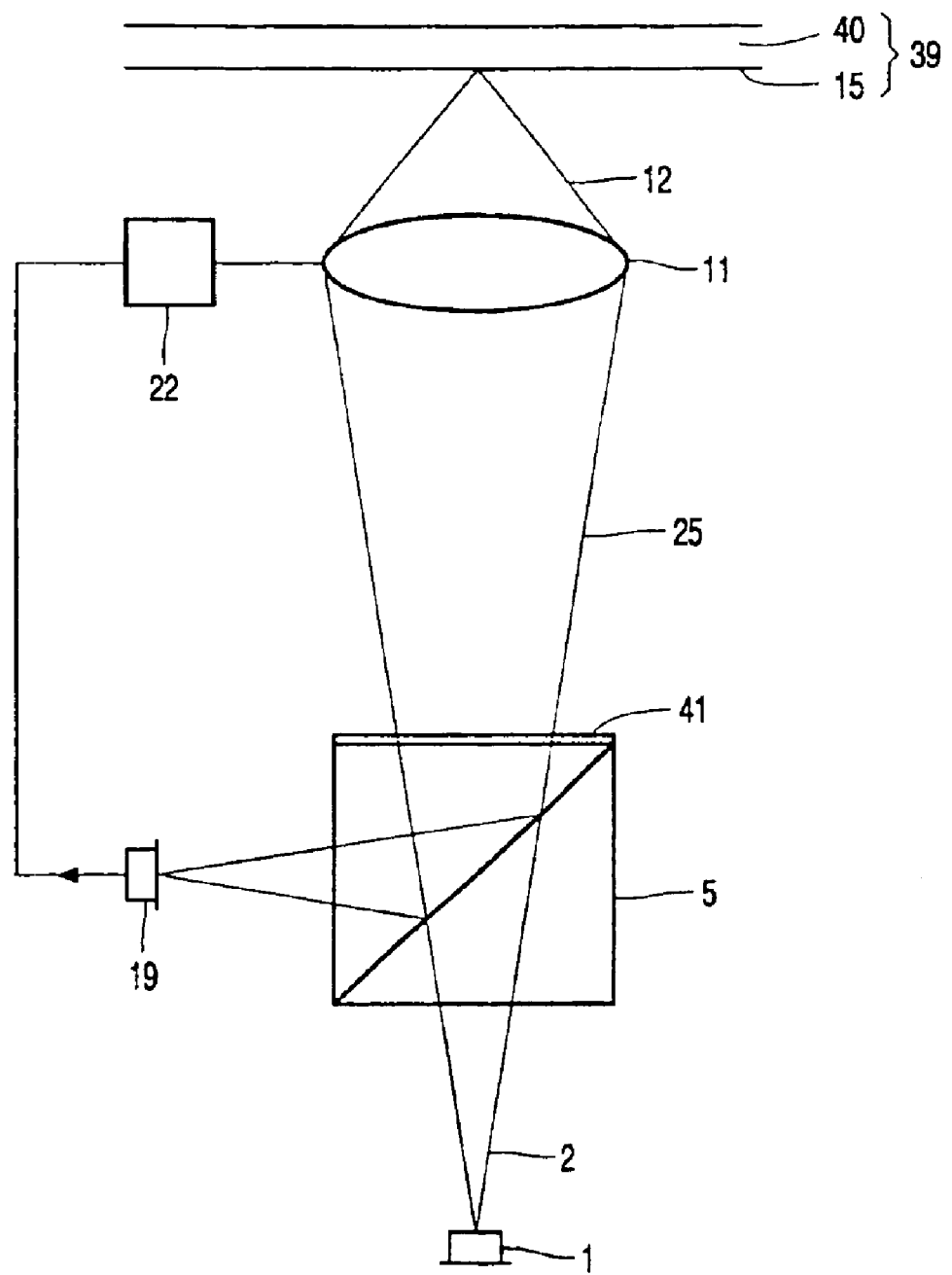

The invention will now be described by way of example and with reference to the accompanying drawings, in which FIG. 1 shows a scanning device according to the invention, FIG. 2 shows a graphical representation of aberrations as a function of the displacement of the objective lens, and FIGS. 3 and 4 shows further embodiments of the scanning device according to the invention.

FIG. 1 shows an embodiment of the scanning device according to the invention. The device has a highly efficient optical path for reading and writing information on a first type of record carrier at a short wavelength and an optical path for reading a second type of record carrier at a long wavelength. The highly efficient optical path comprises a radiation source 1, e.g. a semi-conductor laser, which emits a linearly polarized divergent radiation beam 2 of a first wavelength, e.g. 650 nm. A beam shaper 3 changes the elliptical cross-section of beam 2 into a more circular cross-section. A possible grating 4 forms two diffracted beams and a non-diffracted beam. The diffracted beams are used for tracking purposes. The Figure shows only the non-diffracted beam for sake of clarity. The three radiation beams, briefly called the radiation beam, passes through a polarizing beam splitter 5, which has a high transmission for the radiation beam. A collimator lens 6 converges radiation beam 2 to a collimated beam 7. A dichroic beam splitter 8 has a high transmission for the first wavelength and passes collimated beam 7 with low attenuation. The linear polarization of collimated beam 7 is changed to a circular polarization by a quarter-wave plate 9. A dichroic aperture 10 transmits collimated beam 7 over its entire cross-section. An objective system, here shown as a single objective lens 11, changes collimated beam 7 to a converging beam 12 for scanning a record carrier 13. The objective lens may consist of a single optical element, such as the lens shown in the Figure, but it may also comprise two optical elements. The record carrier is of a first, high-density type and comprises a transparent layer 14 having a thickness of e.g. 0.6 mm, and an information layer 15, onto which converging beam 12 comes to a focus 16. The radiation reflected from information layer 15 returns along the optical path of beams 12 and 7. Quarter-wave plate 9 changes the circular polarization to a linear polarization perpendicular to the linear polarization of the forward collimated beam 7. The reflected beam is converged by collimator lens 6 and reflected by polarizing beam splitter 5. A cylinder lens 17 introduces astigmatism in the reflected beam. A negative lens 18 in the optical path facilitates the adjustment of the position of focus 16. The lenses 17 and 18 may be combined in a single optical element. The reflected beam is incident on a detector system 19, generating output signals from which control signals can be derived for positioning focus 16 and an information signal representing information stored in information layer 15.

The optical path of the second mode used for scanning the second type of record carrier comprises a radiation source 20, e.g. a semi-conductor laser, which emits a linearly polarized diverging radiation beam 21 of a second wavelength, e.g. 780 nm. Radiation sources 1 and 20 may be regarded as one radiation source for generating two radiation beams. A grating 22 forms three beams in a way similar to grating 4. A diffractive beam splitter 23 transmits the beam. A positive lens 24 reduces the vergence of radiation beam 21 to a slightly diverging beam 25. Diverging beam 25 is reflected by dichroic beam splitter 8. Quarter-wave plate 9 changes the linear polarization of the beam to circular. Dichroic aperture 10 transmits the beam over a smaller cross-section than collimated beam 7, because of the different wavelengths of the beams. As a result, objective lens 11 changes diverging beam 25 to a converging beam 26 having a smaller numerical aperture than converging beam 12. Converging beam 26 is suitable for scanning a record carrier 27 of the second type. The record carrier comprises a transparent layer 28, having a thickness of e.g. 1.2 mm, and an information layer 29. Record carriers 13 and 27 are drawn as a single, two-layer record carrier having a semi-transparent information layer 15, but they may also be separate single-layer record carriers having different thickness transparent layers. Converging beam 26 comes to a focus 30 on information layer 29. Radiation reflected from information layer 29 returns on the path of the beams 26 and 25 and part of its radiation is deflected by diffractive beam splitter 23 towards a detection system 30, which has a function similar to that of detection system 19.

Objective lens 11 is designed to converge in the first mode collimated beam 7 of the first wavelength through a transparent layer 14 to focus 16 on information layer 15. The spherical aberration incurred by the converging beam 12 in passing transparent layer 14 is compensated in objective lens 11. The objective lens complies with the sine condition. If transparent layer 14 is not present in a special embodiment of the record carrier, the objective lens should not be compensated for spherical aberration. In the second mode, the radiation beam passes through transparent layer 28, having a thickness which differs from that of transparent layer 14. Hence, in the second mode objective lens 11 must be compensated for another amount of spherical aberration than in the first mode. This different compensation is achieved by making the incident beam 25 divergent, thereby introducing additional spherical aberration in the objective lens, which compensates the additional thickness of the transparent layer. However, in this case the objective lens does not comply with the sine condition.

Objective lens 11 can be translated in a direction parallel and perpendicular to its optical axis for maintaining the focus on the information layer and for maintaining the centre of the focus on the centre of the tracks in the information layer to be followed, respectively. The translation of the objective lens is controlled by a servo circuit 32, which receives position information of the focus from detection system 19 when scanning in the first mode and from detection system 31 when scanning in the second mode. In the sequel, a displacement means a displacement from a centred position in a direction perpendicular to the optical axis of the objective lens and perpendicular to the effective direction of the tracks, unless otherwise indicated. The centred position is the position where the optical axis of the objective system coincides with the central ray of the beam 7 or 25 incident on the objective system. In the first mode, beam 7 incident on objective lens 11 is collimated, and, consequently, a displacement of the objective lens does not affect the optical properties of the lens. In the second mode, beam 25 incident on the objective lens is not collimated, and a displacement of the objective lens causes coma in the converging beam 26, because the objective lens does not comply with the sine condition. The amount of coma depends on the design of the objective lens and the magnitude of the displacement. The coma reduces the field of the objective lens.

The field of the objective lens can be increased according to the invention by introducing spherical aberration in diverging beam 25. The spherical aberration may be introduced by an optical plate without optical power, which imparts a phase change corresponding to spherical aberration on the passing beam. In a preferred embodiment, the number of elements in the optical path is not increased, and the spherical aberration is introduced by an element already present in the optical path of the radiation beam, e.g. by grating 22 or 23 or by lens 24. The gratings may be adapted by changing the optical path through it by means of a coating having a position-dependent thickness. Lens 24 may be adapted by choosing a different design, e.g. by making the lens aspheric. Such a lens may be manufactured by plastic-molding or by the so-called replication process, in which a thin coating having a position-dependent thickness is applied to a spherical lens. The amount of spherical aberration W40 to be introduced in diverging beam 25 depends on the maximum displacement of the objective lens in a direction perpendicular to the optical axis and the desired reduction of the coma. It can be expressed in the following form:

$$W_{40} = \frac{W_{31}}{\frac{4x}{R}}$$

where W31 is the desired reduction of the coma caused by the objective lens, x is the displacement of the objective lens and R the radius of the entrance pupil of the objective lens. In practice, R is about equal to the radius of the effective cross-section of the objective lens. The plane of the entrance pupil of a single-lens objective system can normally be taken as a plane perpendicular to the optical axis of the lens and through the centre of the lens. Both W40 and W31 are Seidel coefficients. When the root-mean-square value of the aberrations is used, the expression becomes:

$$W_{40}(\text{rms}) = \frac{W_{31}(\text{rms})}{\frac{4x}{R}} \sqrt{\frac{72}{180}}$$

The sign of W40 is opposite to the sign of the spherical aberration of a non-corrected positive spherical lens.

The effectiveness of the spherical aberration for reducing coma can be understood as follows. When objective lens 11 is displaced over a distance x, the aberrated wavefront of diverging beam 25 is decentred by an amount x with respect to objective lens 11. Since spherical aberration is proportional to $r^4$, where r is a radius in the pupil, the decentring causes a dependence of the wavefront of the diverging beam on $(r-x)^4$. The term $r^3x$ in this dependence is characteristic for coma. Hence, decentring a wavefront having spherical aberration introduces coma. If the signs of the aberrations match, the coma caused by the decentred beam 25 with the imparted spherical aberration cancels part or all of the coma generated by objective lens 11 due to its off-axis use in the second mode.

The spherical aberration introduced in diverging beam 25 in the second mode should be compensated in objective lens 11. The lens design may not be modified for this purpose, because this is fixed by the requirement of proper imaging in the first mode. A preferred method for compensating the spherical aberration is to change the vergence of beam 25 in such a way that the correct amount of spherical aberration is generated by objective lens 11. This compensation is in addition to the compensation of the spherical aberration for the passage through the transparent layer of the record carrier. In general, the spherical aberration for compensating for the transparent layer has the same sign as the spherical aberration for compensating the spherical aberration introduced in diverging beam 25. The actual change in the divergence can be determined experimentally or be derived from ray-tracing. A simple way of changing the divergence is to change the distance between radiation source 20 and objective lens 11.

As an example, the objective lens has a pupil radius R of 1.3 mm, a maximum displacement x of 0.3 mm and a numerical aperture in the second mode of 0.45. In the first mode the objective lens operates at the set of conjugates $(-\infty,f)$, where f is the focal distance of the objective lens. The coma of a customary objective lens, irradiated from a point source at a distance of 51 mm from the objective lens and displaced by 0.3 mm is 34 mλ rms. A reduction of the coma from 34 mλ rms to 16 mλ.rms is desired. The required compensation of 18 mλ rms coma must be provided by spherical aberration introduced in the diverging beam that enters the objective lens. The compensation should be 3 mλ higher i.e. 21 mλ rms, because of reasons explained below. According to the above formula, the compensation of 21 mλ rms coma requires 14 mλ rms spherical aberration. This spherical aberration introduced in the diverging beam is compensated in the objective lens by reducing the distance of the point source from 51 mm to 47 mm. The reduced distance of the point source increases the coma of the objective lens by 3 mλ. Hence, the coma is reduced from 34+3=37 mλ rms to 16 mλ rms. In the second mode, the objective lens operates at the set of conjugates (v,b), where the objective distance v is equal to −47 mm and the image distance b is slightly larger than f.

The calculation of the required amount of spherical aberration has been made for a diverging beam having a radius equal to the pupil radius of 1.3 mm. However, the diverging beam should preferably have a radius $R_1$ larger than the pupil radius R, so the beam can accommodate both the pupil and the stroke. Since spherical aberration increases with the fourth power of the beam radius, the spherical aberration of the diverging beam with radius $R_1$ should be equal to $$W_{40}(\text{rms}, R_1) = \left(\frac{R_1}{R}\right)^4 W_{40}(\text{rms}, R),$$

where $W_{40}$ (rms,R) is the rms value of the spherical aberration for a wavefront having a radius R. The radiation power of the radiation source 1 is used efficiently if the radius $R_1$ of the diverging beam is substantially equal to the pupil radius R plus the stroke X of the objective system. The 14 mλ rms spherical aberration for a beam radius 1.3 mm becomes $$W_{40}(\text{rms}, R+x) = \left(\frac{R+x}{R}\right)^4 W_{40}(\text{rms}, R)$$
$$= \left(\frac{1.3+0.3}{1.3}\right)^4 14 = 32 m\lambda \text{rms}$$

In a preferred embodiment the diverging beam is elliptical, its cross-section in the entrance pupil having a long axis of R+x in the direction perpendicular to the effective track direction and a short axis of R in the direction perpendicular to it.

It should be understood that the expressions W40 and W40(rms) for the spherical aberration are approximations. A more accurate value of the spherical aberration can be obtained by ray tracing. In the above case, a spherical aberration of the diverging beam of 15 mλ rms instead of 14 mλ rms is required and, for the full aperture, 30 mλ rms instead of 32 mλ rms. The accuracy of the expression for $W_{40}$(rms) is better than 10% for a relatively long focal distance f and low numerical aperture NA (f=2.75 mm and NA=0.45) and about 30% for a relatively short focal distance and high numerical aperture (f=1.8 mm and NA=0.50). In general, the expression provides a value lower than the value obtained by ray training.

An upper limit of the cancellation of the coma is determined by the allowable increase of aberrations in the diffracted beams formed by grating 22. The diffracted beams follow paths through lens 24 and objective lens 11 that are different from that of diverging beam 25. As a result, when the coma of diverging beam 25 is reduced, the coma in the diffracted beams may increase. In a device that does not form diffracted beams, the coma can be compensated to a larger extent, e.g. by a factor of four or eight. In that case the cancellation will be limited by an increase of other, higher order aberrations. If in the above example, the coma should be reduced from 34 mλ rms to 7 mλ rms, 85 mλ rms spherical aberration must be introduced in the full aperture of diverging beam 25. In that case, the total aberration in converging beam 26 is 15 mλ rms. A further reduction of the coma is possible. However, the reduction of the coma is outweighed by an increase of astigmatism and higher-order coma, resulting in a higher total aberration of the converging beam.

FIG. 2 shows a graphical representation of the coma caused by objective lens 11 as a function of the displacement of the objective lens. Line 35 give the amount of coma of the objective lens without the additional spherical aberration introduced in diverging beam 25. Line 36 is similar to line 35, but now the spherical aberration has been introduced according to the invention. Line 37 indicates the total amount of optical aberrations in converging beam 26 without the additional spherical aberration, and line 38 the total amount of optical aberrations with the additional spherical aberration.

Table 1 shows aberrations for four different cases, the first case being the example discussed in the above paragraphs.

TABLE 1

| Objective lens f and NA for 1.2 mm | Coma mλ rms 0.3 mm radial stroke | Coma mλ rms 0.3 mm radial stroke Shorter source distance | W40 mλ rms Factor 2 reduction | W40 mλ rms Factor 2 reduction Full aperture |
|---|---|---|---|---|
| f = 2.75 mm NA = 0.45 | 34 | 37 | 14 | 32 |
| f = 2.75 mm NA = 0.50 | 47 | 51 | 21 | 48 |
| f = 1.8 mm NA = 0.45 | 58 | 68 | 20 | 61 |
| f = 1.8 mm NA = 0.50 | 79 | 93 | 27 | 82 |

The first, left-most column of the table gives for the four cases the focal distance f and the numerical aperture NA of the objective lens in the second mode, i.e. when scanning through a transparent layer having a thickness of 1.2 mm. The second column gives the amount of coma caused by the objective lens when it is displaced by 0.3 mm. The third column also gives the amount of coma, but with the distance between the radiation source and the objective lens reduced to compensate spherical aberration introduced by the collimator lens. The values in the second and third column have been determined by ray tracing. The amount of coma given in the third column is to be reduced by a factor of approximately two for all four cases. The fourth column gives the required amount of spherical aberration W40 to be introduced by the collimator lens between the radiation source and the objective lens. The values in the fourth column have been determined by the above expression for W40(rms). The last column gives the amount of spherical aberration to be introduced by the collimator lens when the beam incident on the objective lens has sufficient width to take up the displacement of the objective lens. A ray trace of the fourth case in Table 1 shows that a reduction from 79 mλ rms coma to 39 mλ rms requires 35 mλ rms $W_{40}$ instead of 27 mλ rms as determined by the expression for $W_{40}$ (rms).

FIG. 3 shows an embodiment of a scanning device according to the invention. Elements in the Figure that are similar to elements in FIG. 1 have the same reference numerals. The embodiment can be made more compact than the embodiment shown in FIG. 1. The optical path used in the first mode for scanning an optical record carrier of the first type comprises a radiation source 50, e.g. semi-conductor laser, emitting a diverging radiation beam 51. After passage through a grating 52, the diverging beam is reflected by a dichroic beam splitter 53 and converged to a collimated beam 54 by a collimator lens 55. Objective lens 11 is designed to transform collimated beam 54 to a focus 16 on information layer 15. Radiation reflected from information layer 15 returns on the path of beams 54 and 51, and is diffracted in part by grating 52 to form a sub-beam, incident on a detection system 56. The detection system generates output signals for controlling the position of focus 16 and an information signal representing information stored in information layer 15. The focus error signal may be formed using the so-called one- or two-spot Foucault method.

The optical path used in the second mode for scanning the second type of record carrier comprises a radiation source 58, e.g. a semi-conductor laser, emitting a diverging radiation beam 59. A collimator lens 60, arranged close to the radiation source, condenses a relatively large part of the total amount of radiation emitted by the radiation source, thereby forming a diverging beam 61. Collimator lens 60 may also have the function of beam shaper, changing the cross-section of diverging beam 59 from elliptical to circular and reducing the astigmatism in the beam. The improved collection of radiation from radiation source 58 due to the collimating and beam-shaping function of collimator lens 60, makes the embodiment shown in FIG. 3 very suitable for both reading and recording information in the second mode. A grating 62, arranged in the path of diverging beam 61, forms three beams in a way similar to grating 4 in FIG. 1. A polarizing beam splitter 63 reflects diverging beam 61 to dichroic beam splitter 53, which passes the beam substantially unattenuated. Collimator lens 60, grating 62 and beam splitter 63 may be integrated into a single element. Collimator lens 55 converges the incoming diverging beam 61 to another diverging beam 64 having a smaller divergence than the incoming beam. In the second mode, objective lens 11 does not operate at the design conjugates, and introduces spherical aberration, compensating for the additional thickness of the transparent layer 28 of record carrier 27. Radiation reflected by information layer 29 returns along the path of the incoming beam and is passed to a detection system 64 through polarizing beam splitter 63 and a lens 65 introducing astigmatism in the beam.

The spherical aberration according to the invention must be introduced in a part of the optical path only used in the second mode. Therefore, collimator lens 55 is less suitable, because it is used both in the first and in the second mode. A more suitable element is collimator 60. Since this element is preferably aspheric because of the above-mentioned beam shaping function, the spherical aberration according to the invention can easily be incorporated in the element without adding to its cost.

FIG. 4 shows a further embodiment of a scanning device according to the invention. Elements in the Figure that are similar to elements in FIG. 1 have the same reference numerals. The scanning device scans a record carrier 39 by converging beam 12. Record carrier 39 comprises a substrate 40 and information layer 15 deposited on it. The information layer may be protected by a transparent layer having a thickness of the order of a wavelength. Objective lens 11 is designed for focussing radiation beam 2 onto information layer 15. Since the objective lens complies with the sine condition, it has a large field. The field can be further increased, if spherical aberration is introduced in diverging beam 25 and the same amount of spherical aberration with opposite sign is compensated in the objective lens. The spherical aberration is preferably introduced in the diverging beam by means of a thin layer 41 on beam splitter 5, the layer having an optical path that varies as a function of position on the layer. The spherical aberration of the objective lens is preferably introduced by incorporating it in the design of the objective lens.

What is claimed is:

1. An optical scanning device for scanning in a first mode a first type of record carrier having a first information layer and a first transparent layer of a first thickness and for scanning in a second mode a second type of record carrier having a second information layer and a second transparent layer of a second thickness different from the first thickness, comprising a radiation source for generating at least one radiation beam and an objective system designed for operation at a first set of conjugates to form a focus at the first information layer in the first mode and for operation at a second, different set of conjugates to form a focus at the second information layer in the second mode, characterized in that the device comprises an optical element, arranged in the radiation path in the second mode from the radiation source to the objective system, for introducing spherical aberration in the radiation beam.

2. Optical scanning device according to claim 1, wherein the spherical aberration of the optical element has a sign opposite to the spherical aberration of a positive plano-spherical lens.

3. Optical scanning device according to claim 1, wherein the optical element is a positive lens, a grating or a thin layer having a position-dependent optical path.

4. Optical scanning device according to claim 1, wherein a first collimator lens is arranged in the radiation path between the radiation source and the objective system in the first and second mode, and the optical element for introducing spherical aberration is a second collimator lens arranged in the radiation path between the radiation source and the objective system in the second mode only.

5. An optical scanning device for scanning a record carrier having an information layer, comprising a radiation source for generating a non-collimated radiation beam and an objective system for converging the non-collimated radiation beam to a focus on the information layer, characterized in that the device comprises an optical element arranged in the radiation path from the radiation source to the objective system for introducing spherical aberration in the non-collimated radiation beam, the spherical aberration having a sign opposite to the sign of the spherical aberration of a positive plano-spherical lens.

6. Optical scanning device according to claim 1 or 5 wherein the objective lens introduces spherical aberration, and the spherical aberrations of the objective lens and the optical element have opposite signs.

7. Optical scanning device according to claim 6, wherein the spherical aberration of the optical element has a sign opposite to the spherical aberration of a positive plano-spherical lens.

8. Optical scanning device according to claim 6, wherein the optical element is a positive lens, a grating or a thin layer having a position-dependent optical path.

9. Optical scanning device according to claim 1 or 5, wherein the optical element introduces an amount of spherical aberration W40 (rms) substantially equal to $$\frac{W_{31}(\text{rms})}{\left(\frac{4x}{R}\right)}\sqrt{\frac{72}{180}}$$

where W31 (rms) is a predetermined amount of coma with which coma introduced by the objective system when displaced by a distance x in the second mode is reduced, x is a displacement of the objective system from a centered position in a direction perpendicular to an optical axis of the objective system, and R is a radius of an entrance pupil of the objective lens.

10. Optical scanning device according to claim 9, wherein the radiation beam has a radius $R_1$ larger than R in a plane of the entrance pupil, and the optical element introduces an amount of spherical aberration in the radiation beam substantially equal to $$\left(\frac{R_1}{R}\right)^4 W_{40}(\text{rms}).$$

11. Optical scanning device according to claim 5, wherein the optical element is a positive lens, a grating or a thin layer having a position-dependent optical path.

* * * * *